US011923595B2

(12) United States Patent
Nakachi et al.

(10) Patent No.: US 11,923,595 B2
(45) Date of Patent: Mar. 5, 2024

(54) PARAPET-HANGING-TYPE ANTENNA MOUNT

(71) Applicants: EXEO GROUP, INC., Tokyo (JP); DAISHINSANGYO KABUSHIKI KAISHA, Osaka (JP)

(72) Inventors: Shigeki Nakachi, Tokyo (JP); Takeji Goto, Osaka (JP)

(73) Assignees: EXEO GROUP, INC., Tokyo (JP); DAISHINSANGYO KABUSHIKI KAISHA, Osaka (JP)

( * ) Notice: Subject to any disclaimer, the term of this patent is extended or adjusted under 35 U.S.C. 154(b) by 0 days.

(21) Appl. No.: 18/006,746

(22) PCT Filed: Mar. 17, 2021

(86) PCT No.: PCT/JP2021/010782
§ 371 (c)(1),
(2) Date: Jan. 25, 2023

(87) PCT Pub. No.: WO2022/024449
PCT Pub. Date: Feb. 3, 2022

(65) Prior Publication Data
US 2023/0216172 A1 Jul. 6, 2023

(30) Foreign Application Priority Data
Jul. 31, 2020 (JP) ................................ 2020-130179

(51) Int. Cl.
*H01Q 1/12* (2006.01)

(52) U.S. Cl.
CPC ......... *H01Q 1/1221* (2013.01); *H01Q 1/1235* (2013.01); *H01Q 1/125* (2013.01)

(58) Field of Classification Search
CPC .... H01Q 1/1221; H01Q 1/125; H01Q 1/1235; H01Q 1/3258; H01Q 1/10; H01Q 1/1228; H01Q 1/1242; H01Q 1/1207
(Continued)

(56) References Cited

U.S. PATENT DOCUMENTS 2,483,396 A * 10/1949 Benson .................. E04G 25/06 403/109.5
2,496,264 A * 2/1950 Benson .................. H01Q 1/10 403/106
(Continued)

FOREIGN PATENT DOCUMENTS

CN 209743984 U * 12/2019 ............. F16M 11/06
DE 20312195 U1 * 1/2004 ........... H01Q 1/1221
(Continued)

OTHER PUBLICATIONS

International Preliminary Report on Patentability of the corresponding WIPO application No. PCT/JP2021/010782 dated Jan. 31, 2023, which includes Written Opinion of the International Searching Authority of PCT/JP2021/010782 dated May 18, 2021, and English translation of the Written Opinion of the International Searching Authority.

*Primary Examiner* — Taylor Morris
(74) *Attorney, Agent, or Firm* — Muncy, Geissler, Olds & Lowe, P.C.

(57) ABSTRACT

A mount main body for a parapet-hanging-type antenna is provided with a vertical support column part (or VSC part) that vertically hangs down along an outer wall surface of parapet. The antenna is installed to VSC part so as not to protrude upward from the parapet. A horizontal support column part (or HSC part) that bends and horizontally extends in a direction orthogonal to the parapet is provided at an upper end of VSC part. The mount main body is provided with a cylinder holding HSC part such that HSC
(Continued)

part is movable frontward/backward along a central axis thereof and is rotatable about the central axis. VSC part is made pullable to an inner wall side of the parapet by rotating HSC part about the central axis, and moving HSC part to the inner wall side of the parapet along the central axis.

4 Claims, 14 Drawing Sheets

(58) Field of Classification Search
USPC ........................................... 403/349; 343/880
See application file for complete search history.

(56) References Cited

U.S. PATENT DOCUMENTS

| | | | | | |
|---|---|---|---|---|---|
| 3,943,524 | A * | 3/1976 | Sample | H01Q 1/1221 248/539 |
| 4,542,804 | A * | 9/1985 | Power | A62B 1/02 182/150 |
| 4,692,770 | A * | 9/1987 | Kadokura | H01Q 1/3258 343/715 |
| 4,939,524 | A * | 7/1990 | Blaese | H01Q 1/1285 343/882 |
| 5,544,851 | A * | 8/1996 | Moore | F16M 13/02 248/544 |
| 5,647,567 | A * | 7/1997 | Pugh, Jr. | H01Q 1/1221 248/323 |
| 5,982,340 | A * | 11/1999 | Troche | H01Q 1/1214 343/890 |
| 6,585,080 | B2 * | 7/2003 | Murray | E04G 21/3242 248/231.71 |
| 6,727,861 | B2 * | 4/2004 | Antoine | H01Q 1/1207 248/237 |
| 6,731,250 | B1 * | 5/2004 | Berman | H01Q 1/1221 343/883 |
| 7,683,853 | B2 * | 3/2010 | Michaelis | H01Q 1/125 343/882 |
| 8,928,549 | B2 * | 1/2015 | McDonnell | H01Q 1/1221 343/895 |
| 9,249,595 | B1 * | 2/2016 | Reski | E04H 12/345 |
| 9,543,634 | B1 * | 1/2017 | Bailey | F16M 11/28 |
| 11,437,702 | B2 * | 9/2022 | Han | H01Q 1/005 |
| 2002/0149536 | A1 * | 10/2002 | Safakhah | H01Q 1/1242 343/882 |
| 2008/0054136 | A1 * | 3/2008 | Gou | H01Q 1/1207 248/205.5 |
| 2009/0115684 | A1 * | 5/2009 | Wang | H01Q 1/1207 343/882 |
| 2015/0372379 | A1 * | 12/2015 | Zhao | H01Q 1/246 343/841 |
| 2016/0211576 | A1 * | 7/2016 | Vassilakis | H01Q 1/1228 |
| 2021/0098857 | A1 * | 4/2021 | Ojha | H05K 7/186 |

FOREIGN PATENT DOCUMENTS

| | | | | |
|---|---|---|---|---|
| FR | 2791182 | A1 * | 9/2000 | H01Q 1/1221 |
| FR | 2815476 | A1 * | 4/2002 | H01Q 1/1221 |
| FR | 2823014 | A1 * | 10/2002 | H01Q 1/1221 |
| FR | 2824956 | A1 * | 11/2002 | H01Q 1/1221 |
| FR | 2898180 | A1 * | 9/2007 | H01Q 1/1221 |
| FR | 3092895 | A1 * | 8/2020 | E04H 12/18 |
| GB | 2392562 | A * | 3/2004 | H01Q 1/084 |
| JP | H07-013941 | U | 3/1995 | |
| JP | 2001-237622 | A | 8/2001 | |
| JP | 2003-069322 | A | 3/2003 | |
| JP | 2003-179416 | A | 6/2003 | |
| JP | 2018-186440 | A | 11/2018 | |
| KR | 101118164 | B1 * | 3/2012 | H01Q 1/1221 |

* cited by examiner

PARAPET-HANGING-TYPE ANTENNA MOUNT

TECHNICAL FIELD

This invention relates to a parapet-hanging-type antenna mount that is used to install an antenna of a mobile phone base station to a parapet formed in a rooftop periphery of a building.

BACKGROUND ART

Radio waves that are used in a communication network of the fifth generation (5G) mobile communication system have a transmission distance shorter than that of the 4G, and also have a property of being easily shielded by buildings. Hence, in order to enrich the communication environment thereof, it is necessary to install a large number of base station antennas all over the town.

Up to now, a base station of a mobile communication system is installed in many cases by attaching an antenna to a big steel tower or by attaching an antenna to a parapet located around a rooftop of an office building, an apartment building, or the like.

In the case of installing an antenna to a parapet on a rooftop, the antenna is installed in many cases by attaching a pole-type mount for antenna installation to the parapet (Patent Literatures 1 to 3).

CITATION LIST

Patent Literature

Patent Literature 1: Japanese Patent Laid-Open No. 2001-237622

Patent Literature 2: Japanese Patent Laid-Open No. 2003-69322

Patent Literature 3: Japanese Patent Laid-Open No. 2018-186440

SUMMARY OF INVENTION

Technical Problem

However, if such a pole-type mount for antenna installation is installed to a parapet on a rooftop of an office building, an apartment building, or the like, there arises a problem that a row of pole-type antennas stand on the rooftop to spoil the landscape.

Particularly, in a region in which restrictions on the landscape are strict, it is required to install an antenna such that the antenna does not protrude upward from a parapet on a rooftop.

Therefore, for example, as illustrated in FIG. 14, it has been a common practice to provide a vertical support column 101 that vertically hangs down along an outer wall surface of a parapet P to a mount main body 100 that is fixed to an upper part of the parapet P on a rooftop of a building, and install an antenna A to the vertical support column 101 so as not to protrude upward from the parapet P, whereby the landscape is taken into consideration.

However, in the case where the antenna A is installed to the vertical support column 101 that vertically hangs down along the outer wall surface of the parapet P, when maintenance of the antenna A is intended to be performed, a worker needs to perform the work while leaning forward from an inner wall surface side of the parapet P to the outer wall surface side thereof. This causes problems of low workability and dangerousness.

In view of this, this invention is intended to provide a parapet-hanging-type antenna mount that enables a worker to safely perform work without leaning forward from an inner wall surface side of a parapet to an outer wall surface side thereof at the time of maintenance of an antenna, the parapet-hanging-type antenna mount being a mount for antenna installation, including: a mount main body that is fixed to an upper part of the parapet on a rooftop of a building; and a vertical support column part that is provided in the mount main body and vertically hangs down along an outer wall surface of the parapet, in which the antenna is installed to the vertical support column part so as not to protrude upward from the parapet.

Solution to Problem

In order to solve the above-mentioned problems, this invention provides a parapet-hanging-type antenna mount, including: a mount main body that is fixed to an upper part of a parapet on a rooftop of a building; and a vertical support column part that is provided in the mount main body and vertically hangs down along an outer wall surface of the parapet, in which an antenna is installed to the vertical support column part so as not to protrude upward from the parapet, the parapet-hanging-type antenna mount, including: a horizontal support column part that is provided at an upper end of the vertical support column part and bends and horizontally extends in a direction orthogonal to the parapet toward an inner wall surface side of the parapet; and a support column holding cylinder that is provided in the mount main body and holds the horizontal support column part such that the horizontal support column part is movable frontward/backward along a central axis in a length direction thereof and is rotatable about the central axis, in which the vertical support column part is made pullable to an inner wall side of the parapet by rotating the horizontal support column part about the central axis to place a leading end of the vertical support column part to face heavenward, and moving the horizontal support column part to the inner wall side of the parapet along the central axis.

The support column holding cylinder may be extended to the inner wall side of the parapet, and a counterweight that achieves a balance between a load on a front side of the mount main body and a load on a back side of the mount main body may be installed to this extended part.

Moreover, the support column holding cylinder may be provided with: a longitudinal groove that extends in a front-back direction along the central axis; and a lateral groove that extends in a circumferential direction of the support column holding cylinder so as to be continuous with a front end of the longitudinal groove and be orthogonal to the longitudinal groove. The horizontal support column part may be provided with a guide protrusion that is fitted in the front end of the longitudinal groove of the support column holding cylinder in a state where the vertical support column part is located on a front side of the outer wall surface of the parapet and where the leading end of the vertical support column part faces heavenward. The horizontal support column part may thus be made pullable backward while being guided by the guide protrusion fitted in the longitudinal groove. A length in a circumferential direction of the lateral groove may be set such that: in a state where the guide protrusion fitted in the longitudinal groove is located at the front end of the longitudinal groove, the horizontal support column part is made rotatable about the central axis along the lateral groove; in a state where the guide protrusion is located at a leading end position of the lateral groove, the leading end of the vertical support column part faces vertically downward; and in a state where the guide protrusion is located at a connection position between the lateral groove and the longitudinal groove, the leading end of the vertical support column part faces heavenward.

A pressing bolt that fixes the support column holding cylinder and the horizontal support column part may be screwed in the support column holding cylinder, in a state where the vertical support column part is vertical with the leading end thereof facing downward on the front side of the outer wall surface of the parapet and in a state where the vertical support column part is pulled to the inner wall side of the parapet with the leading end thereof facing heavenward.

An operating arm that is orthogonal to the horizontal support column part and is attachable/detachable to/from the horizontal support column part may be provided at a back end of the horizontal support column part.

Advantageous Effects of Invention

As described above, according to this invention, when an antenna of a mobile phone base station is installed to a rooftop of a building, in order to achieve harmonization with the landscape of the town, the antenna can be installed to a vertical support column part so as not to protrude from an upper part of a parapet, the vertical support column part vertically hanging down with a leading end thereof facing downward along an outer wall surface on a front side of the parapet. Moreover, at the time of maintenance of the antenna, the vertical support column part to which the antenna is installed can be pulled to an inner wall side on a back side of the parapet with the leading end thereof facing heavenward. Hence, the work can be safely performed from the rooftop on the inner wall side of the parapet.

DESCRIPTION OF EMBODIMENT

Hereinafter, a parapet-hanging-type antenna mount according to an embodiment of this invention is described with reference to FIG. 1 to FIG. 13. In the parapet-hanging-type antenna mount according to this embodiment, when an antenna A of a mobile phone base station is installed to a rooftop of a building, in order to achieve harmonization with the landscape of the town, the antenna A can be installed to an outer wall surface on a front side of a parapet P (the state illustrated in FIG. 1) so as not to protrude from an upper part of the parapet P. Moreover, at the time of maintenance of the antenna A, the antenna A is pulled to an inner wall side on a back side of the parapet P, whereby the work can be safely performed from the rooftop on the inner wall side of the parapet P (the states illustrated in FIG. 11 and FIG. 13).

Figure 1:
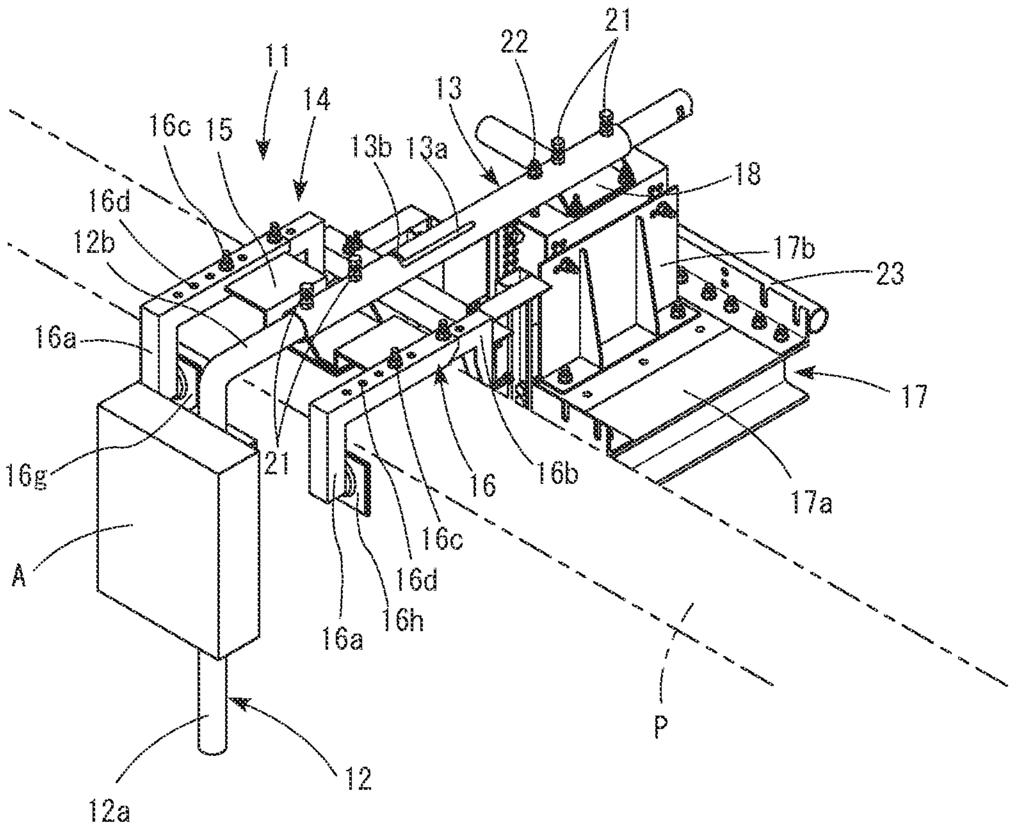
FIG. 1 is a perspective view illustrating the state where an antenna is installed along an outer wall surface of a parapet, using a parapet-hanging-type antenna mount according to an embodiment of this invention.
Figure 2:
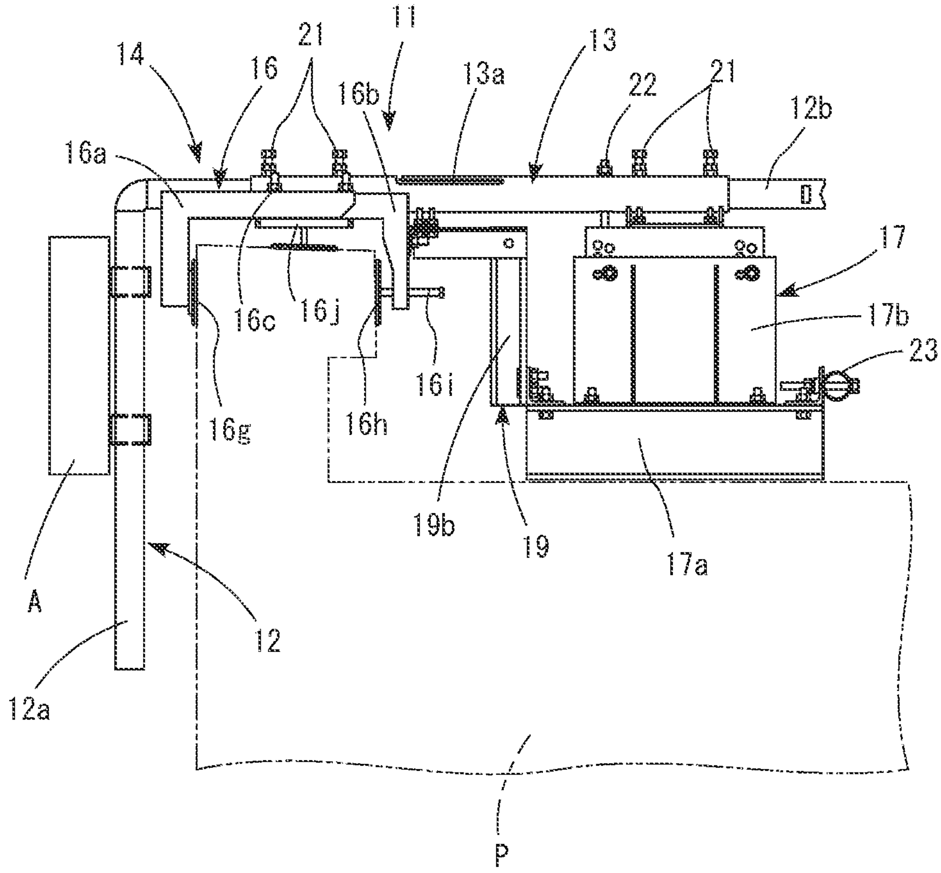
FIG. 2 is a side view of FIG. 1.
Figure 3:
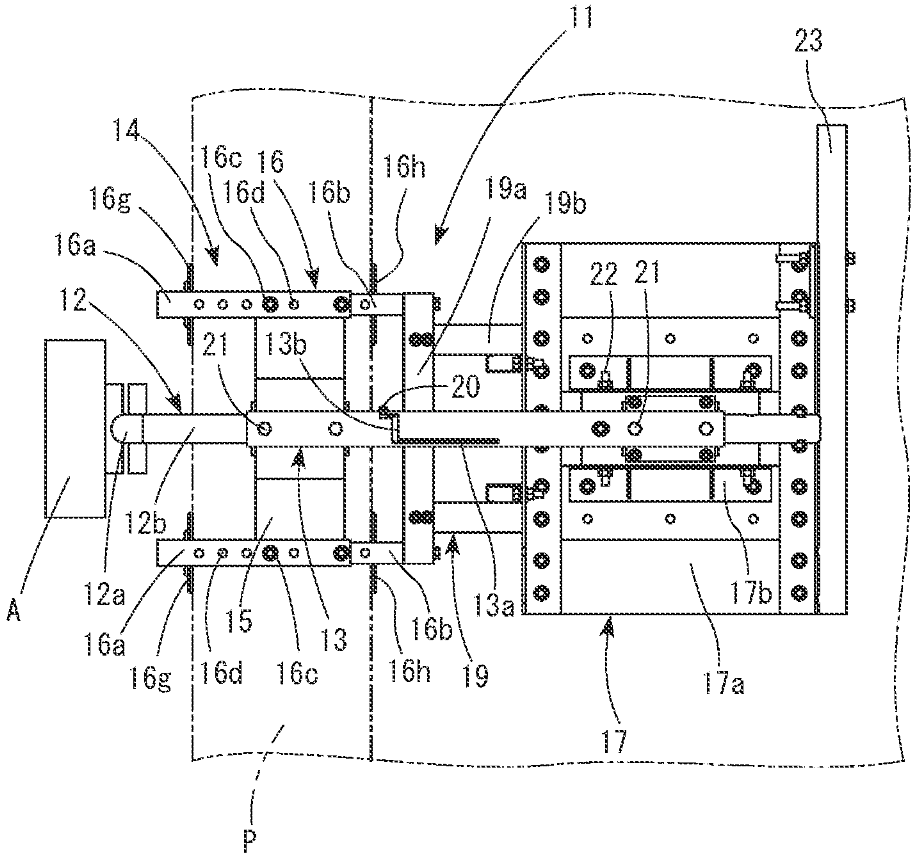
FIG. 3 is a plan view of FIG. 1.

As illustrated in FIG. 1 to FIG. 3, the parapet-hanging-type antenna mount according to this invention includes: a mount main body 11 that is fixed to the parapet P on the rooftop of the building; and an antenna support column 12 that is provided in the mount main body 11 and to which the antenna A is attached.

The antenna support column 12 includes: a vertical support column part 12*a* that vertically hangs down with a leading end thereof facing downward along the outer wall surface of the parapet P; and a horizontal support column part 12*b* that bends in a direction orthogonal to the parapet P from an upper end of the vertical support column part 12*a* toward the inner wall surface side of the parapet P. The antenna A is attached to the vertical support column part 12*a*, and the horizontal support column part 12*b* is attached to the mount main body 11.

A support column holding cylinder 13 is installed in the mount main body 11. The support column holding cylinder 13 holds the horizontal support column part 12*b* such that the horizontal support column part 12*b* is movable frontward/backward along a central axis in a length direction thereof and is rotatable about the central axis.

The mount main body 11 includes: a parapet fixation part 14 that is fixed to the upper part of the parapet P; and an attachment pedestal 15 to which the support column holding cylinder 13 is installed.

The parapet fixation part 14 includes a pair of left and right U-shaped frame members 16 that each have an opening part facing downward and straddle the upper part of the parapet P.

Figure 4:
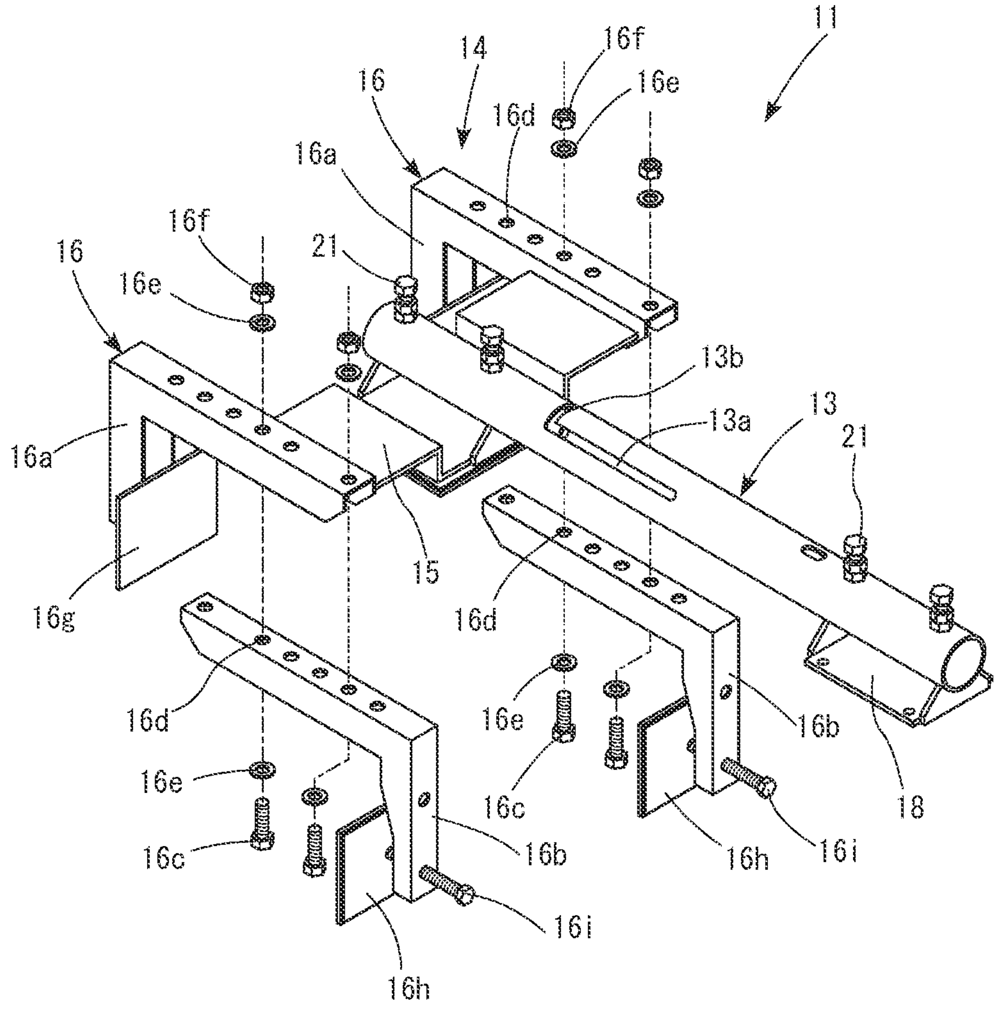
FIG. 4 is a developed perspective view of a mount main body portion of the parapet-hanging-type antenna mount in FIG. 1.

As illustrated in FIG. 4, the U-shaped frame members 16 each include a pair of front and back L-shaped metal fittings 16*a*, 16*b* that are each formed from a horizontal part and a vertical part. The respective horizontal parts of the pair of front and back L-shaped metal fittings 16*a*, 16*b* overlap one above the other, and a plurality of bolt holes 16*d* are provided in this overlapping portion at intervals in the front-back direction. Then, the respective intervals between the opposed vertical parts of the pair of front and back L-shaped metal fittings 16*a*, 16*b* are changed frontward/backward in accordance with the attachment width of the parapet P. The bolt holes 16*d* that fit the attachment width of the parapet P are selected, and bolts 16*c* are respectively inserted through the selected bolt holes 16*d*. The bolts 16*c* are respectively fastened by nuts 16*f* via washers 16*e*. In this way, the respective intervals between the opposed vertical parts of the pair of front and back L-shaped metal fittings 16*a*, 16*b* can be adjusted in accordance with the attachment width of the parapet P.

A front-side pressurization-contact plate 16*g* and a back-side pressurization-contact plate 16*h* are respectively installed to lower ends of the opposed vertical parts of the L-shaped metal fittings 16*a*, 16*b*. The back-side pressurization-contact plate 16*h* is installed to the lower end of the L-shaped metal fitting 16*b* on the back side by a bolt 16*i* so as to be movable frontward/backward, and the back-side pressurization-contact plate 16*h* is pushed frontward by the bolt 16*i*. As a result, the parapet P can be clamped by the front-side pressurization-contact plate 16*g* and the back-side pressurization-contact plate 16*h*, and the parapet fixation part 14 can be firmly fixed to the parapet P.

The attachment pedestal 15 for the support column holding cylinder 13 is placed so as to be orthogonal to the pair of left and right U-shaped frame members 16, and have both ends that are respectively welded and fixed to the horizontal parts of the left and right L-shaped metal fittings 16*a*. As illustrated in FIG. 2, a pressing plate 16*j* that presses an upper surface of the parapet P is installed to a lower surface of the attachment pedestal 15 such that the height thereof is adjustable.

The support column holding cylinder 13 has a length that is at least more than twice the front-back width of the mount main body 11. A front end of the support column holding cylinder 13 is welded and fixed to the attachment pedestal 15 for the support column holding cylinder 13, and a back end thereof significantly protrudes on the inner wall side of the parapet P.

The horizontal support column part 12*b* of the antenna support column 12 is inserted through the support column holding cylinder 13, and has such a length that a back end of the horizontal support column part 12*b* protrudes backward from the support column holding cylinder 13 in the state where the vertical support column part 12*a* is located on the outer wall surface side of the parapet P.

A counterweight 17 is attached to a lower portion of the back end of the support column holding cylinder 13, in order to achieve a balance between a load on the front side and a load on the back side with the mount main body 11 as the center.

The counterweight 17 is formed from: a pedestal part 17*a* that is installed to the rooftop of the building; and a standing plate part 17*b* that erects upward from the pedestal part 17*a*. A coupling pedestal 18 that is fixed by bolts to an upper surface of the standing plate part 17*b* of the counterweight 17 is welded to a lower surface of the back end of the support column holding cylinder 13.

The pedestal part 17*a* of the counterweight 17 and the mount main body 11 are coupled to each other by a coupling metal fitting 19. The coupling metal fitting 19 is formed from: a coupling plate 19*a* that connects the respective left and right vertical parts of the L-shaped metal fittings 16*b*; and inverted L-shaped coupling plates 19*b* each having a front end coupled to the coupling plate 19*a* and a back end coupled to a front end of the pedestal part 17*a* of the counterweight 17.

As described above, the horizontal support column part 12*b* of the antenna support column 12 is held inside the support column holding cylinder 13 so as to be movable in the front-back direction along the central axis in the length direction thereof and rotatable about the central axis.

The support column holding cylinder 13 is provided with: a longitudinal groove 13*a* that extends in the front-back direction along the central axis; and a lateral groove 13*b* that extends in the circumferential direction so as to be continuous with a front end of the longitudinal groove 13*a* and be orthogonal to the longitudinal groove 13*a*. A guide protrusion 20 fitted in the longitudinal groove 13*a* and the lateral groove 13*b* is attached to the horizontal support column part 12*b*. As a result, along the longitudinal groove 13*a*, the horizontal support column part 12*b* moves frontward/backward inside the support column holding cylinder 13. Moreover, along the lateral groove 13*b*, the horizontal support column part 12*b* rotates inside the support column holding cylinder 13.

The guide protrusion 20 is formed from a bolt that is inserted from an outer surface side of the support column holding cylinder 13 into the horizontal support column part 12*b*.

Figure 5:
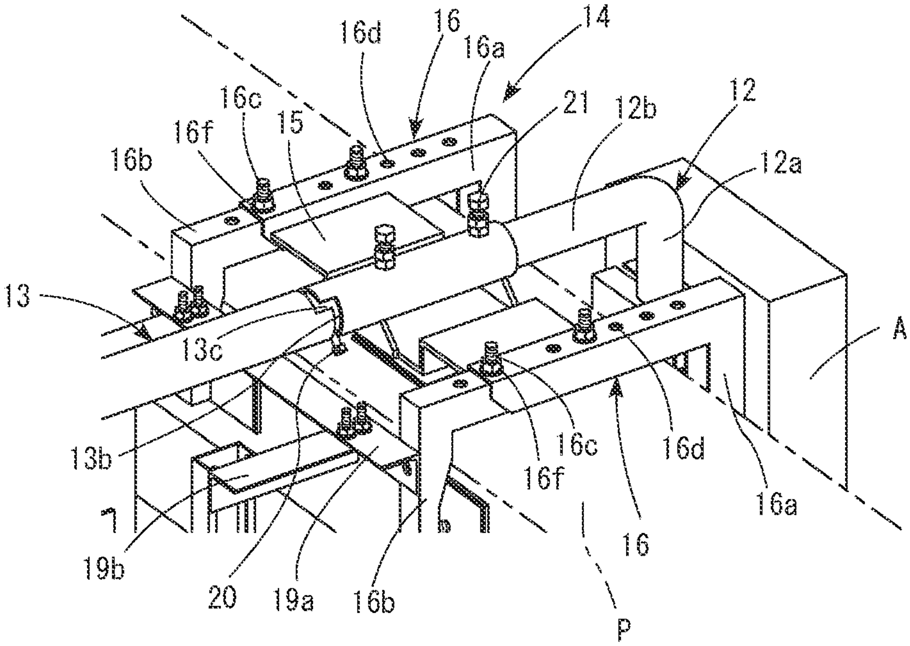
FIG. 5 is a partial perspective view illustrating the state where the antenna is installed to the parapet using the parapet-hanging-type antenna mount in FIG. 1.

As illustrated in FIG. 5, the guide protrusion 20 is located at a leading end of the lateral groove 13*b*, in the state as illustrated in FIG. 1 where the vertical support column part 12*a* of the antenna support column 12 is vertical with the leading end thereof facing downward on the front side of the outer wall surface of the parapet P.

The lateral groove 13*b* is provided within the range of 180° in the circumferential direction of the support column holding cylinder 13. The lateral groove 13*b* is divided into two front and back stages by a communicating longitudinal groove 13*c* that extends in the front-back direction, at a position of half the distance from the longitudinal groove 13*a* to the leading end of the lateral groove 13*b*, that is, a position of 90° in the circumferential direction from the longitudinal groove 13*a*. This prevents the lateral groove 13*b* from being formed in a straight line in the circumferential direction, and thus prevents the lateral groove 13*b* from making the strength of the support column holding cylinder 13 insufficient. The length in the front-back direction of the longitudinal groove 13*a* is about 200 mm, and the length in the front-back direction of the communicating longitudinal groove 13*c* is about 20 mm.

As described above, the support column holding cylinder 13 is provided with the lateral groove 13*b* that is continuous with the front end of the longitudinal groove 13*a* and is orthogonal to the longitudinal groove 13*a*. Then, in the state where the guide protrusion 20 is located at the front end of the longitudinal groove 13*a*, the vertical support column part 12*a* is located on the front side of the outer wall surface of the parapet P. In this state, if the horizontal support column part 12*b* inside the support column holding cylinder 13 is rotated about the central axis to a position at which the guide protrusion 20 abuts against the leading end position of the lateral groove 13*b*, the vertical support column part 12*a* becomes vertical with the leading end thereof facing downward as illustrated in FIG. 1 to FIG. 3.

The lateral groove 13*b* is provided within the range of 180° in the circumferential direction of the support column holding cylinder 13. Hence, if the horizontal support column part 12*b* inside the support column holding cylinder 13 is rotated by 180° about the central axis of the support column holding cylinder 13 such that the guide protrusion 20 fitted at the leading end position of the lateral groove 13*b* moves along the lateral groove 13*b* to the front end position of the longitudinal groove 13*a*, the vertical support column part 12*a* becomes vertical with the leading end thereof facing heavenward as illustrated in FIG. 10.

Figure 10:
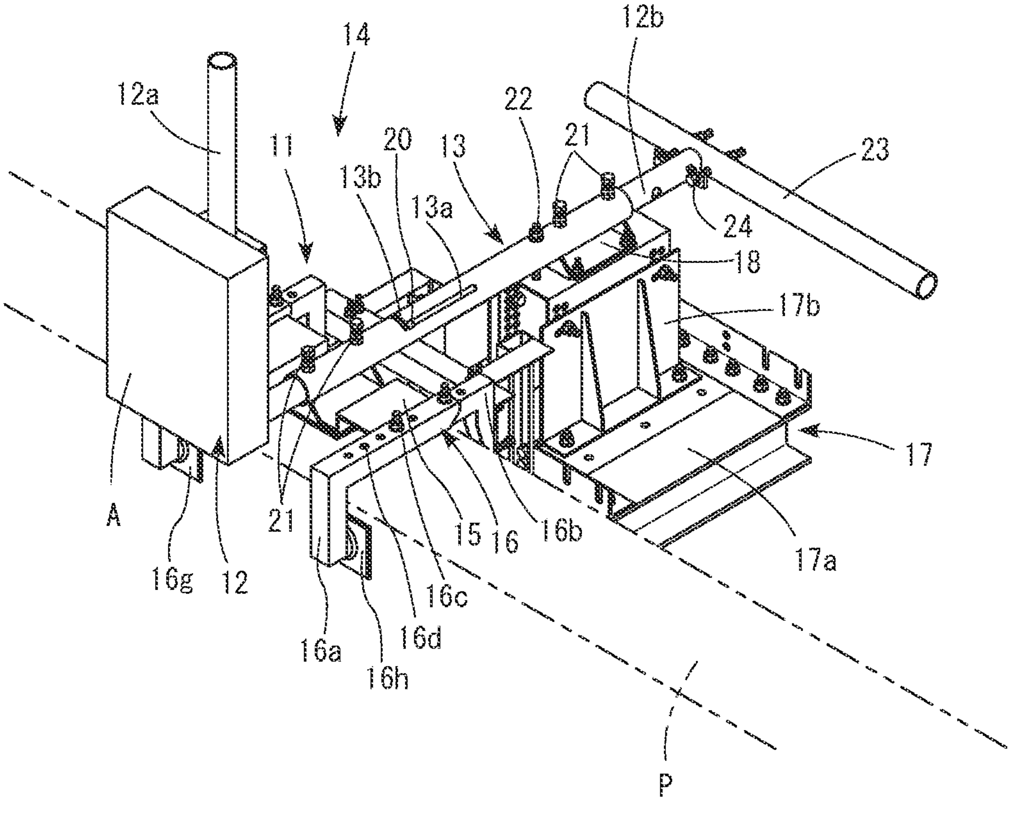
FIG. 10 is a perspective view illustrating the state where the operating arm at the back end of the horizontal support column part is further rotated by 90° and a leading end of the vertical support column part is thus caused to face heavenward, from the state in FIG. 9.
Figure 11:
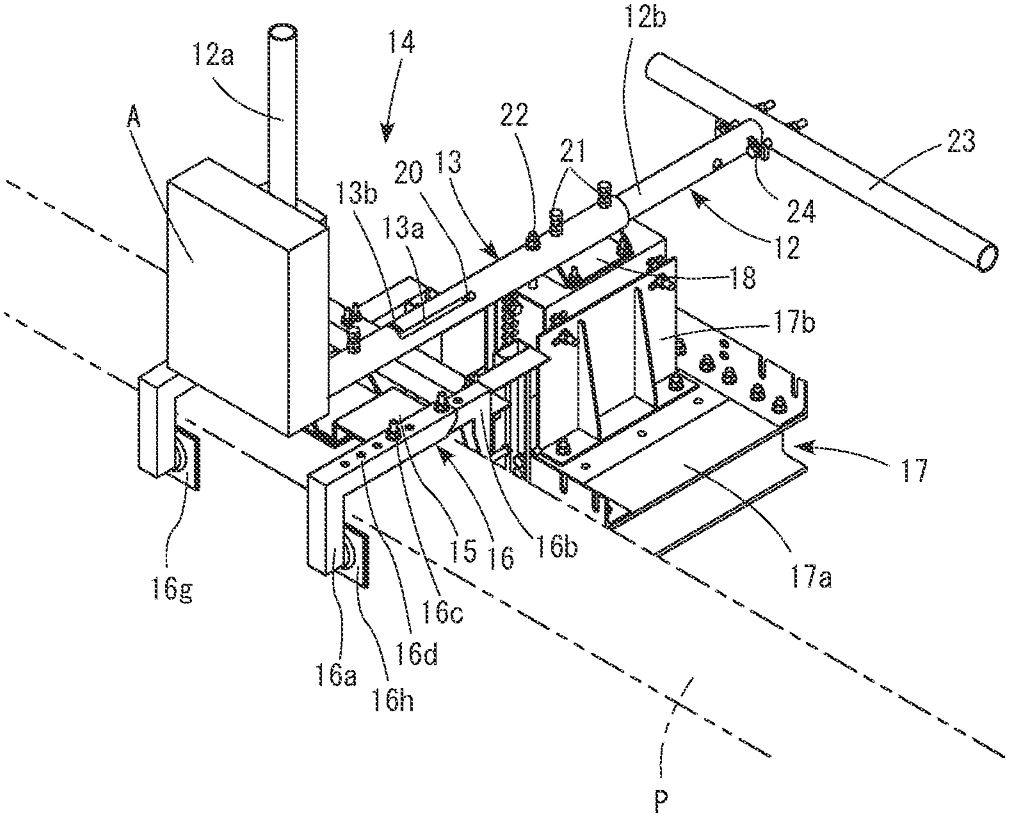
FIG. 11 is a perspective view illustrating the state where the horizontal support column part is pulled backward from the state in FIG. 10.
Figure 12:
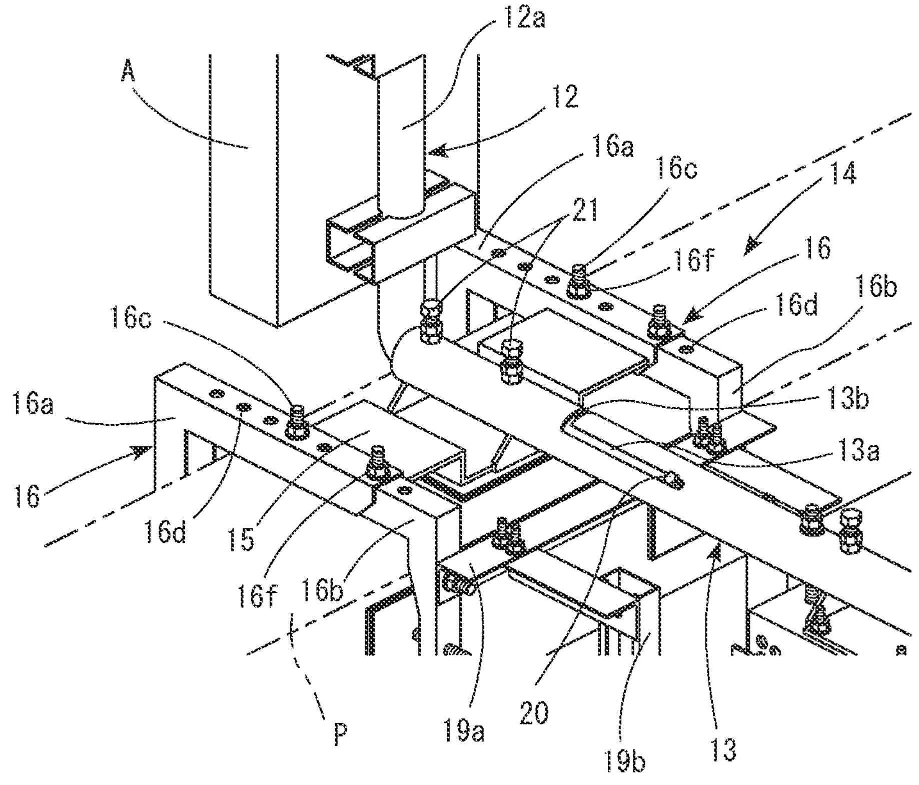
FIG. 12 is a partial enlarged perspective view of the state in FIG. 11.

Then, from the state illustrated in FIG. 10 where the leading end of the vertical support column part 12*a* faces heavenward, the horizontal support column part 12*b* is pulled backward inside the support column holding cylinder 13. As a result, while the guide protrusion 20 of the horizontal support column part 12*b* is guided by the longitudinal groove 13*a*, as illustrated in FIG. 11 and FIG. 12, the horizontal support column part 12*b* is pulled straight backward, and the vertical support column part 12*a* moves from the front-side position of the outer wall surface of the parapet P to the vicinity of the inner wall of the parapet P.

As described above, the horizontal support column part 12*b* is held by the support column holding cylinder 13 so as to be movable frontward/backward along the central axis in the length direction thereof and be rotatable about the central axis inside the support column holding cylinder 13. In this case, it is necessary to prevent the horizontal support column part 12*b* from moving frontward/backward or rotating inside the support column holding cylinder 13 in the installation state of the antenna A illustrated in FIG. 1 where the leading end of the vertical support column part 12*a* faces vertically downward and in the state illustrated in FIG. 11 where the vertical support column part 12*a* is pulled to the inner wall surface side of the parapet P with the leading end thereof facing heavenward. To this end, pressing bolts 21 that press the horizontal support column part 12*b* from the outer surface are screwed in the support column holding cylinder 13, for the purpose of fixing the support column holding cylinder 13 and the horizontal support column part 12*b*.

The number of the pressing bolts 21 that are screwed in each of a front end part and a back end part of the support column holding cylinder 13 is two. Moreover, in the installation state of the antenna A illustrated in FIG. 1 where the leading end of the vertical support column part 12*a* faces downward and in the state illustrated in FIG. 11 where the vertical support column part 12*a* is pulled to the inner wall surface side of the parapet P with the leading end thereof facing heavenward, the support column holding cylinder 13 and the horizontal support column part 12*b* are each provided with a through-hole. Then, a fixing bolt 22 is inserted in the through-hole, whereby the fixing power of the pressing bolts 21 is reinforced. The fixing bolt 22 is attached to the standing plate part 17*b* of the counterweight 17.

Figure 6:
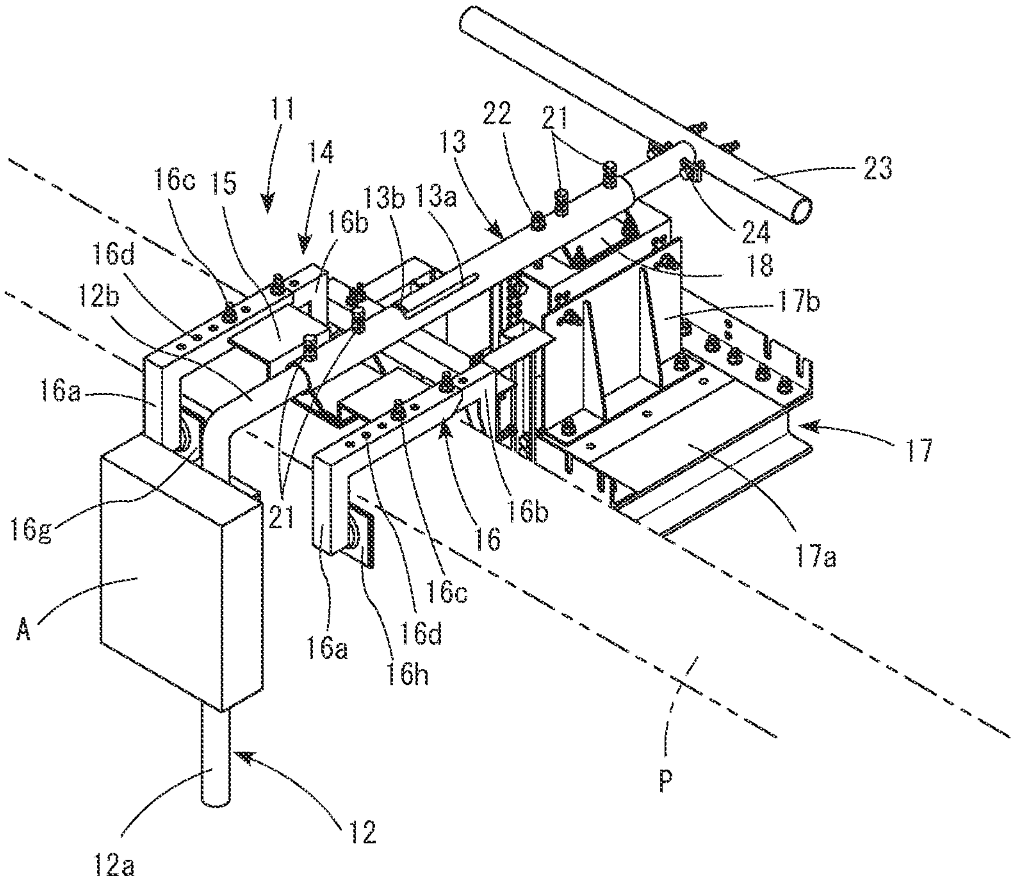
FIG. 6 is a perspective view illustrating the state where an operating arm is fitted to a back end of a horizontal support column part of the parapet-hanging-type antenna mount in FIG. 1.

In order to move the horizontal support column part 12*b* frontward/backward or rotate the same inside the support column holding cylinder 13, as illustrated in FIG. 6, an operating arm 23 is attached to the horizontal support column part 12*b* of the antenna support column 12 so as to be orthogonal to the horizontal support column part 12*b*, the horizontal support column part 12*b* protruding backward from the back end of the support column holding cylinder 13. The operating arm 23 can be detachably attached to the horizontal support column part 12*b* of the antenna support column 12 via attachment metal fittings 24. When the operating arm 23 is not operated, the attachment metal fittings 24 can be detached, and the operating arm 23 can be stored in a back surface lower end of the pedestal part 17*a* of the counterweight 17.

In the following procedures, the antenna A is installed to the parapet P using the mount for installation according to this invention.

First, the respective intervals between the opposed vertical parts of the pair of front and back L-shaped metal fittings 16*a*, 16*b* of the mount main body 11 are adjusted in accordance with the attachment width of the parapet P. Then, the parapet fixation part 14 is attached to the upper part of the parapet P such that the support column holding cylinder 13 installed to the mount main body 11 is horizontal and is orthogonal to the parapet P. Then, the back-side pressurization-contact plate 16*h* is pushed frontward. As a result, the parapet P is clamped by the front-side pressurization-contact plate 16*g* and the back-side pressurization-contact plate 16*h*, and the parapet fixation part 14 is firmly fixed to the parapet P.

The counterweight 17 is attached to the lower portion of the back end of the support column holding cylinder 13, and the pedestal part 17*a* of the counterweight 17 and the mount main body 11 are coupled to each other by the coupling metal fitting 19.

Next, the pressing bolts 21 that fix the support column holding cylinder 13 and the horizontal support column part 12*b* are loosened, and the fixing bolt 22 that penetrates through the support column holding cylinder 13 and the horizontal support column part 12*b* is drawn out, whereby the state where the fixation between the support column holding cylinder 13 and the horizontal support column part 12*b* is cancelled is obtained.

Figure 13:
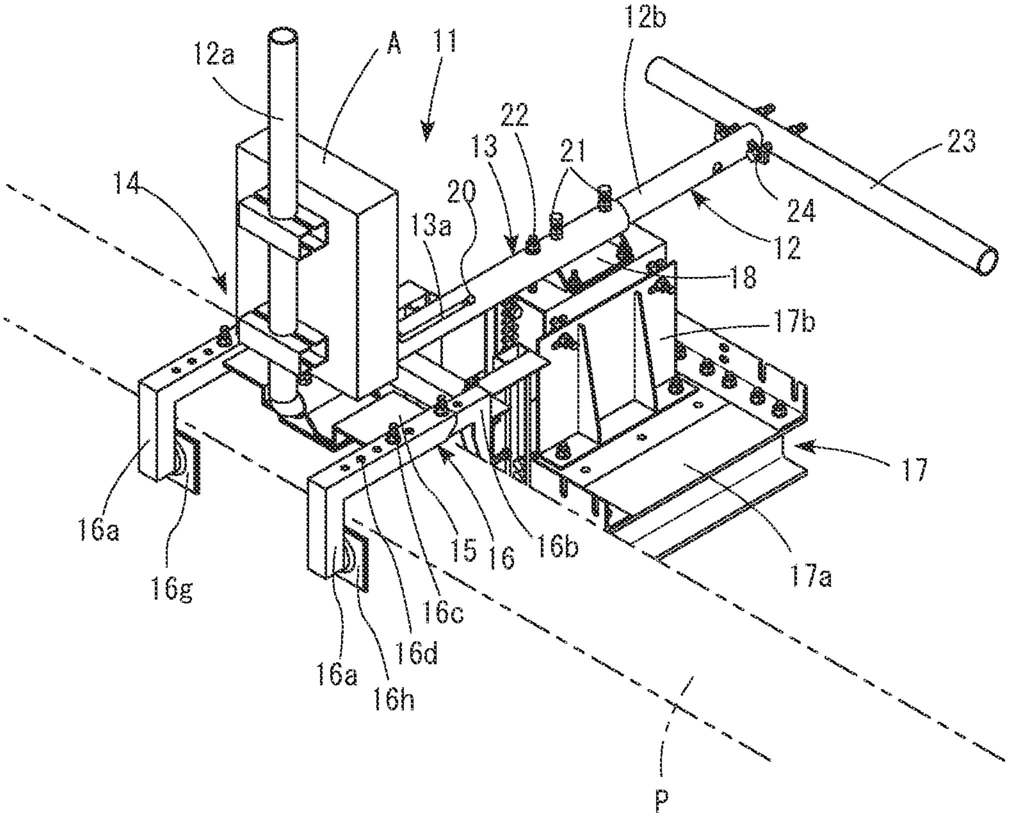
FIG. 13 is a perspective view illustrating the state where the antenna is rotated to an inner wall side of the parapet from the state in FIG. 11.
Figure 14:
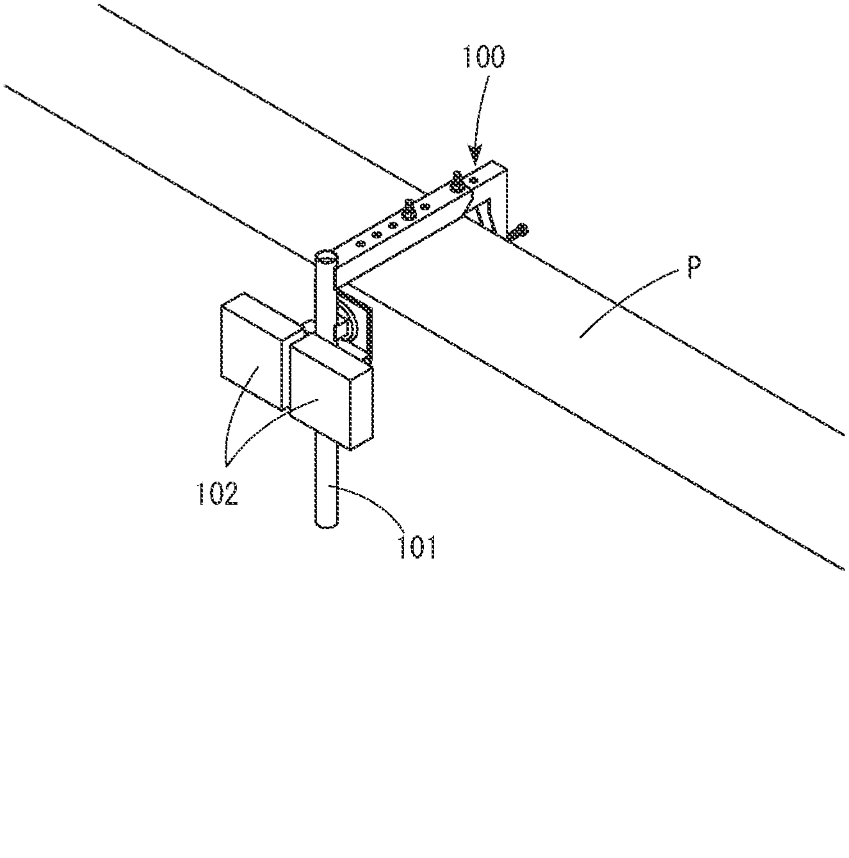
FIG. 14 is a perspective view illustrating the state where an antenna is installed along an outer wall surface of a parapet using a conventional parapet-hanging-type antenna mount.

In the state where the operating arm 23 is attached to the back end of the horizontal support column part 12*b* and where the leading end of the vertical support column part 12*a* faces heavenward, the operating arm 23 is pulled backward. As a result, while the guide protrusion 20 of the horizontal support column part 12*b* is guided by the longitudinal groove 13*a* of the support column holding cylinder 13, the horizontal support column part 12*b* slides backward inside the support column holding cylinder 13. As illustrated in FIG. 13, the vertical support column part 12*a* of the antenna support column 12 is pulled to the vicinity of the inner wall side of the parapet P.

In the state where the vertical support column part 12*a* is pulled to the vicinity of the inner wall side of the parapet P, as illustrated in FIG. 13, the antenna A is attached to the vertical support column part 12*a* while being caused to face the inner wall side of the parapet P. After that, as illustrated in FIG. 11 and FIG. 12, the antenna A is rotated about the vertical support column part 12*a* so as to face the outer wall side of the parapet P.

Subsequently, from the state illustrated in FIG. 11, the operating arm 23 is pushed frontward as illustrated in FIG. 10, the vertical support column part 12*a* is moved to the outer wall side of the parapet P, and the guide protrusion 20 of the horizontal support column part 12*b* is located at the front end position of the longitudinal groove 13*a* of the support column holding cylinder 13.

Figure 7:
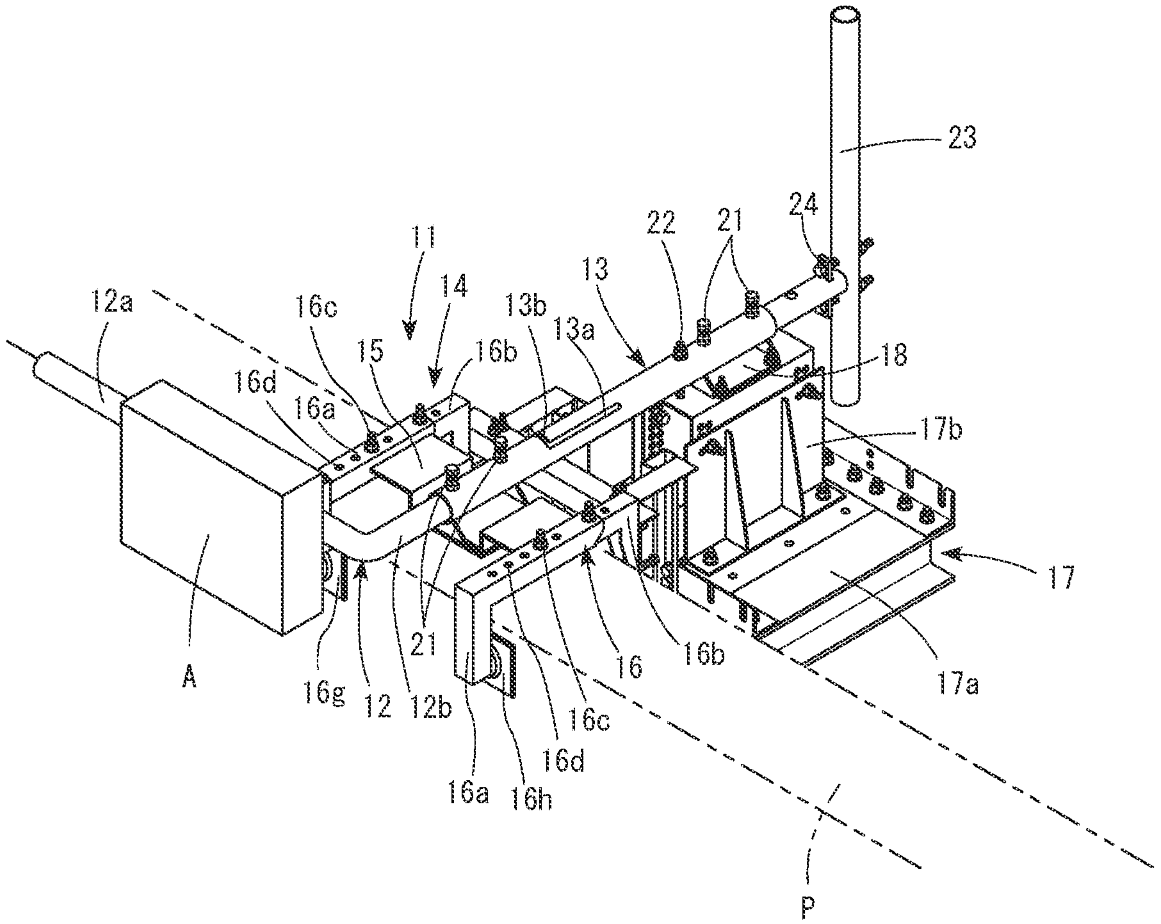
FIG. 7 is a perspective view illustrating the state where the operating arm at the back end of the horizontal support column part of the parapet-hanging-type antenna mount in FIG. 1 is rotated by 90° and a vertical support column part is thus made horizontal.
Figure 9:
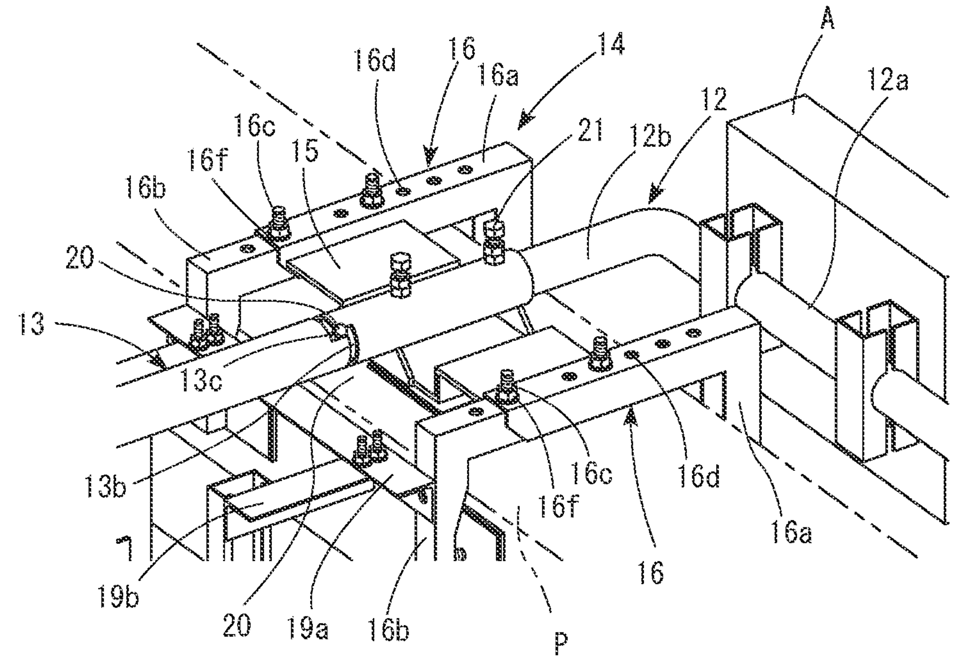
FIG. 9 is a partial enlarged perspective view illustrating the state where the horizontal support column part is slightly pulled backward from the state in FIG. 7.

In this state, as illustrated in FIG. 7 and FIG. 9, the operating arm 23 is rotated by 90° in the counterclockwise direction, the guide protrusion 20 of the horizontal support column part 12*b* is moved to an intermediate position of the lateral groove 13*b* of the support column holding cylinder 13, and the vertical support column part 12*a* is thus brought into a horizontal state.

Figure 8:
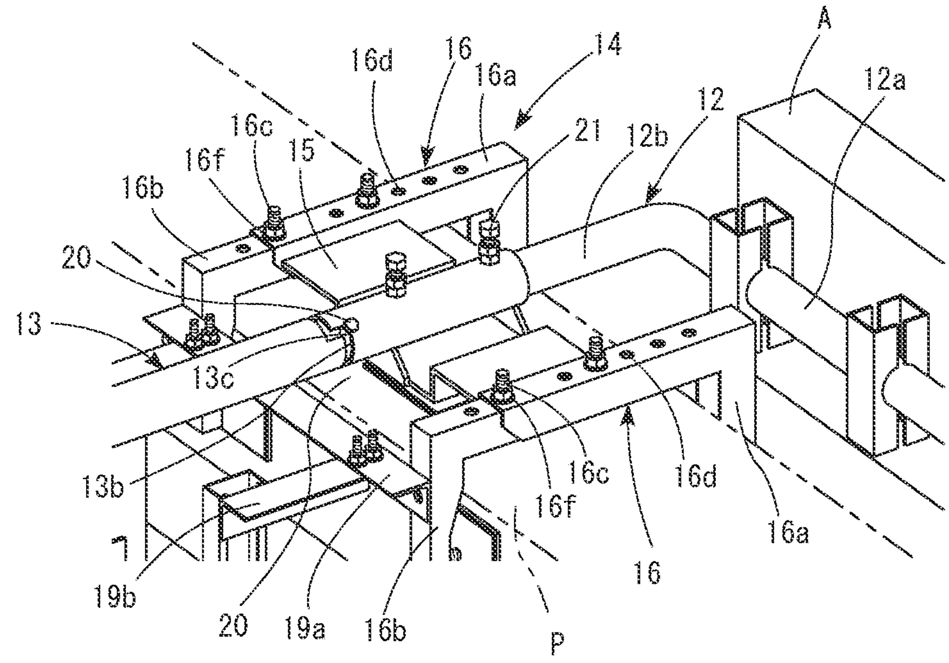
FIG. 8 is a partial enlarged perspective view of the state in FIG. 7.

After this, the operating arm 23 is slightly pushed frontward, and the guide protrusion 20 is moved to a front end of the communicating longitudinal groove 13*c* as illustrated in FIG. 8. In this state, the operating arm 23 is further rotated by 90° in the counterclockwise direction as illustrated in FIG. 6, and the guide protrusion 20 of the horizontal support column part 12*b* is moved to the leading end position of the lateral groove 13*b*. As a result, as illustrated in FIG. 6, the vertical support column part 12*a* becomes vertical with the leading end thereof facing downward, and the antenna A attached to the vertical support column part 12*a* is installed along the outer wall surface of the parapet P such that an upper part of the antenna A does not protrude from the upper part of the parapet P.

After this, as illustrated in FIG. 1, the operating arm 23 at the back end of the horizontal support column part 12*b* is detached. The fixing bolt 22 is inserted in the through-hole provided to each of the support column holding cylinder 13 and the horizontal support column part 12*b*, and the pressing bolts 21 are fastened, whereby the support column holding cylinder 13 and the horizontal support column part 12*b* are fixed to each other. In this way, the installation work of the antenna A is completed.

When the maintenance of the antenna A is performed from this installation state of the antenna A, in the following procedures, the vertical support column part 12*a* can be pulled to the inner wall side of the parapet P as illustrated in FIG. 13, from the installation state of the antenna A illustrated in FIG. 1 where the leading end of the vertical support column part 12*a* faces downward.

First, the pressing bolts 21 that fix the support column holding cylinder 13 and the horizontal support column part 12*b* are loosened, and the fixing bolt 22 that penetrates through the support column holding cylinder 13 and the horizontal support column part 12*b* is drawn out, whereby the state where the fixation between the support column holding cylinder 13 and the horizontal support column part 12*b* is cancelled is obtained. Then, as illustrated in FIG. 6, the operating arm 23 is attached to the back end of the horizontal support column part 12*b*.

Then, as illustrated in FIG. 7 and FIG. 8, the operating arm 23 is rotated by 90° in the clockwise direction, the guide protrusion 20 of the horizontal support column part 12*b* is moved to the intermediate position of the lateral groove 13*b* of the support column holding cylinder 13, and the vertical support column part 12*a* is brought into the horizontal state.

After this, the operating arm 23 is slightly pulled backward, and the guide protrusion 20 is moved to a back end of the communicating longitudinal groove 13*c* as illustrated in FIG. 9. In this state, the operating arm 23 is further rotated by 90° in the clockwise direction as illustrated in FIG. 10, and the guide protrusion 20 of the horizontal support column part 12*b* is moved to the front end position of the longitudinal groove 13*a*. As a result, as illustrated in FIG. 10, the vertical support column part 12*a* becomes vertical with the leading end thereof facing heavenward.

In the state illustrated in FIG. 10 where the leading end of the vertical support column part 12*a* faces heavenward, the operating arm 23 is pulled backward. As a result, while the guide protrusion 20 of the horizontal support column part 12*b* is guided by the longitudinal groove 13*a* of the support column holding cylinder 13, the horizontal support column part 12*b* slides backward inside the support column holding cylinder 13. As illustrated in FIG. 11, the vertical support column part 12*a* of the antenna support column 12 is pulled to the vicinity of the inner wall side of the parapet P.

After this, the fixing bolt 22 is inserted in the through-hole provided to each of the support column holding cylinder 13 and the horizontal support column part 12*b*, and the pressing bolts 21 are fastened, whereby the support column holding cylinder 13 and the horizontal support column part 12*b* are fixed to each other. Then, as illustrated in FIG. 13, the antenna A is rotated about the vertical support column part 12*a* so as to face the inner wall side of the parapet P. In this state, a worker can safely perform the maintenance of the antenna A without leaning forward from the rooftop on the inner wall side of the parapet P to the outside of the parapet P. As described above, if the mount for installation according to this invention is used, the installation work and maintenance work of the antenna A can be safely performed from the rooftop on the inner wall side of the parapet P.

This invention is not limited to the above-mentioned embodiment, and can be further carried out in various modes within a range not departing from the gist of this invention, as a matter of course. The scope of this invention is described in Claims, and further includes meanings equivalent to those described in Claims and all changes within the scope.

REFERENCE SIGNS LIST

11: mount main body
12: antenna support column
12*a*: vertical support column part
12*b*: horizontal support column part
13: support column holding cylinder
13*a*: longitudinal groove
13*b*: lateral groove
13*c*: communicating longitudinal groove
14: parapet fixation part
15: attachment pedestal
16: frame member
16*a*, 16*b*: L-shaped metal fitting
16*c*: bolt
16*d*: bolt hole
16*e*: washer
16*f*: nut
16*g*: front-side pressurization-contact plate
16*h*: back-side pressurization-contact plate
16*i*: bolt
16*j*: pressing plate
17: counterweight
17*a*: pedestal part
17*b*: standing plate part
18: coupling pedestal
19: coupling metal fitting
19*a*, 19*b*: coupling plate
20: guide protrusion
21: pressing bolt
22: fixing bolt
23: operating arm
24: attachment metal fitting
A: antenna
P: parapet

The invention claimed is:

1. A parapet-hanging-type antenna mount, comprising: a mount main body that is fixed to an upper part of a parapet on a rooftop of a building; and a vertical support column part that is provided in the mount main body and vertically hangs down along an outer wall surface of the parapet, in which an antenna is installed to the vertical support column part so as not to protrude upward from the parapet, the parapet-hanging-type antenna mount, comprising:

a horizontal support column part that is provided at an upper end of the vertical support column part and horizontally extends in a direction orthogonal to the parapet toward an inner wall surface side of the parapet; and a support column holding cylinder that is provided in the mount main body and holds the horizontal support column part such that the horizontal support column part is movable frontward/backward along a central axis in a length direction thereof and is rotatable about the central axis, wherein the vertical support column part is configured to be pullable to an inner wall side of the parapet by rotating the horizontal support column part about the central axis to place a leading end of the vertical support column part to face heavenward, and moving the horizontal support column part to the inner wall side of the parapet along the central axis, the support column holding cylinder is provided with: a longitudinal groove that extends in a front-back direction along the central axis; and a lateral groove that extends in a circumferential direction of the support column holding cylinder so as to be continuous with a front end of the longitudinal groove and be orthogonal to the longitudinal groove, the horizontal support column part is provided with a guide protrusion that is fitted in the front end of the longitudinal groove of the support column holding cylinder in a state where the vertical support column part is located on a front side of the outer wall surface of the parapet and where the leading end of the vertical support column part faces heavenward, the horizontal support column part is thus configured to be pullable backward while being guided by the guide protrusion fitted in the longitudinal groove, and a length in a circumferential direction of the lateral groove is set such that:

in a state where the guide protrusion fitted in the longitudinal groove is located at the front end of the longitudinal groove, the horizontal support column part is configured to be rotatable about the central axis along the lateral groove;

in a state where the guide protrusion is located at a leading end position of the lateral groove, the leading end of the vertical support column part faces vertically downward; and in a state where the guide protrusion is located at a connection position between the lateral groove and the longitudinal groove, the leading end of the vertical support column part faces heavenward.

2. The parapet-hanging-type antenna mount according to claim 1, wherein the support column holding cylinder is extended to the inner wall side of the parapet, and a counterweight that achieves a balance between a load on a front side of the mount main body and a load on a back side of the mount main body is installed to this extended part.

3. The parapet-hanging-type antenna mount according to claim 1, comprising a pressing bolt that fixes the support column holding cylinder and the horizontal support column part is screwed in the support column holding cylinder, in a state where the vertical support column part is vertical with the leading end thereof facing downward on the front side of the outer wall surface of the parapet and a state where the vertical support column part is pulled to the inner wall side of the parapet with the leading end thereof facing heavenward.

4. The parapet-hanging-type antenna mount according to claim 1, comprising an operating arm that is provided at a back end of the horizontal support column part, the operating arm being orthogonal to the horizontal support column part and being attachable/detachable to/from the horizontal support column part.

* * * * *